United States Patent [19]
Cottam et al.

[11] 3,929,597
[45] Dec. 30, 1975

[54] PRODUCTION OF LEAD AND SILVER FROM THEIR SULFIDES

[75] Inventors: Stephen M. Cottam, Osburn; Howard E. Day, Silverton; William A. Griffith, Osburn, all of Idaho

[73] Assignee: Hecla Mining Company, Wallace, Idaho

[22] Filed: May 17, 1974

[21] Appl. No.: 470,719

[52] U.S. Cl. .................. 204/66; 75/104; 75/114; 75/118; 75/109; 75/120
[51] Int. Cl.² ......................................... C25C 3/34
[58] Field of Search ............ 75/118, 120, 109, 104, 75/114; 204/66

[56] References Cited
UNITED STATES PATENTS

| | | | |
|---|---|---|---|
| 1,434,087 | 10/1922 | Christensen | 204/66 |
| 1,539,714 | 5/1925 | Christensen | 75/120 X |
| 2,655,472 | 10/1953 | Hilliard et al. | 75/120 X |

*Primary Examiner*—G. Ozaki
*Attorney, Agent, or Firm*—Wegner, Stellman, McCord, Wiles & Wood

[57] ABSTRACT

A process for recovering lead and silver from sulfide ore by contact with aqueous ferric chloride solution to form insoluble chlorides of lead and silver, leaching the ore with aqueous sodium chloride solution to dissolve said salts, cooling the solution to precipitate lead chloride which is subjected to electrolysis, and precipitating silver with copper.

The disclosure also includes a further leaching with sodium sulfide after the brine leach followed by a further ferric leach and a further brine leach.

The disclosure also includes a process in which ferric chloride solution is regenerated in situ in the portion of the apparatus where the first leaching takes place from the ferrous chloride solution that is produced during the leaching plus added chlorine gas which may be produced from molten salt electrolysis of lead chloride to produce lead metal and the chlorine.

The disclosure also includes a process in which the metal sulfides include tetrahedrite minerals that are normally resistant to ferric salt solution leaching and in which this ore is pretreated prior to the ferric solution first leaching with an aqueous alkaline sodium hydroxide solution to decompose the tetrahedrite after which the solid residue remaining is subjected to the process outlined above.

22 Claims, 3 Drawing Figures

3,929,597

PRODUCTION OF LEAD AND SILVER FROM THEIR SULFIDES

BACKGROUND OF THE INVENTION

This invention relates to producing metals from their ores and concentrates and especially to production of lead and silver metals from their sulfide materials such as ores and concentrates by subjecting the materials to a series of stages during which the sulfides are converted to the corresponding chlorides by reacting the sulfides with ferric chloride and thereafter dissolving the lead and silver chloride by treating with a sodium chloride brine solution followed by crystallizing out the lead chloride and then displacing the silver from the resulting solution by cementation on copper.

Other features and advantages of the invention will be apparent from the description herein of certain embodiments thereof.

DESCRIPTION OF THE PRIOR ART AND ADVANTAGES THEREOF

The principal difficulty in producing lead and silver from their sulfide ores is mainly centered in the production of lead metal. In producing lead from its sulfide ores and concentrates it is customary to feed the material to a sintering machine where the ore or concentrate is heated at an elevated temperature in contact with air with the result that the major portion of the sulfide sulfur is converted to sulfur dioxide gas and the lead becomes a lead oxide, sulfate, or silicate. The solid product from this sintering stage is then mixed with coke and the mixture heated in a blast furnace to oxidize any remaining sulfur to sulfur dioxide and reduce the lead compounds to the metal. The silver content of the raw material will be combined with the lead along with varying quantities of any copper, bismuth, arsenic and antimony present, all of which must be extracted from the molten lead before it can be classified as commercial grade lead.

A principal objection to this traditional and customary process for producing lead is the emission of large quantities of gases that contain sulfur dioxide from the sintering and blast furnace operations. It is becoming increasingly a requirement that this sulfur dioxide be removed from the effluent gas before the gas can be expelled to the atmosphere. The customary way is to convert the sulfur dioxide to sulfuric acid but this is an expensive procedure especially when the gas produced during the lead smelting is relatively low in sulfur dioxide. Another disadvantage is that if more than enough sulfuric acid is produced than can be readily marketed it must be disposed of by expensive means such as neutralization. Another way in which the sulfur dioxide can be disposed of is to convert it to elemental sulfur with the use of a reducing agent but this procedure is also quite expensive.

In addition the usual facilities for producing either sulfuric acid or sulfur do not utilize all of the sulfur dioxide present so that the ultimate effluent gas still contains appreciable amounts of sulfur dioxide and therefore the gas must be further cleaned.

The processes of the present invention avoid these difficulties as they produce elemental sulfur directly from the sulfide feed stock and this sulfur may itself be used to regenerate one of the reactants in the process as will be explained hereinafter.

A further disadvantage in the traditional lead production process is the necessity of purifying the molten lead after its production in the blast furnace. This hot molten lead from the furnace is difficult to transfer and to store and must be treated in a series of process steps to recover and extract the silver, copper, bismuth and other impurities or the metal must be cast into anodes and electrorefined. Either treatment is expensive in both equipment and operating costs.

In the process of the present invention, in contrast, the silver is recovered and the above impurities are removed before the lead metal itself is produced. This means that it is unnecessary to purify the bulk lead once it has been produced.

DESCRIPTION OF THE PREFERRED EMBODIMENTS FIG. 1 EMBODIMENT

Figure 1:
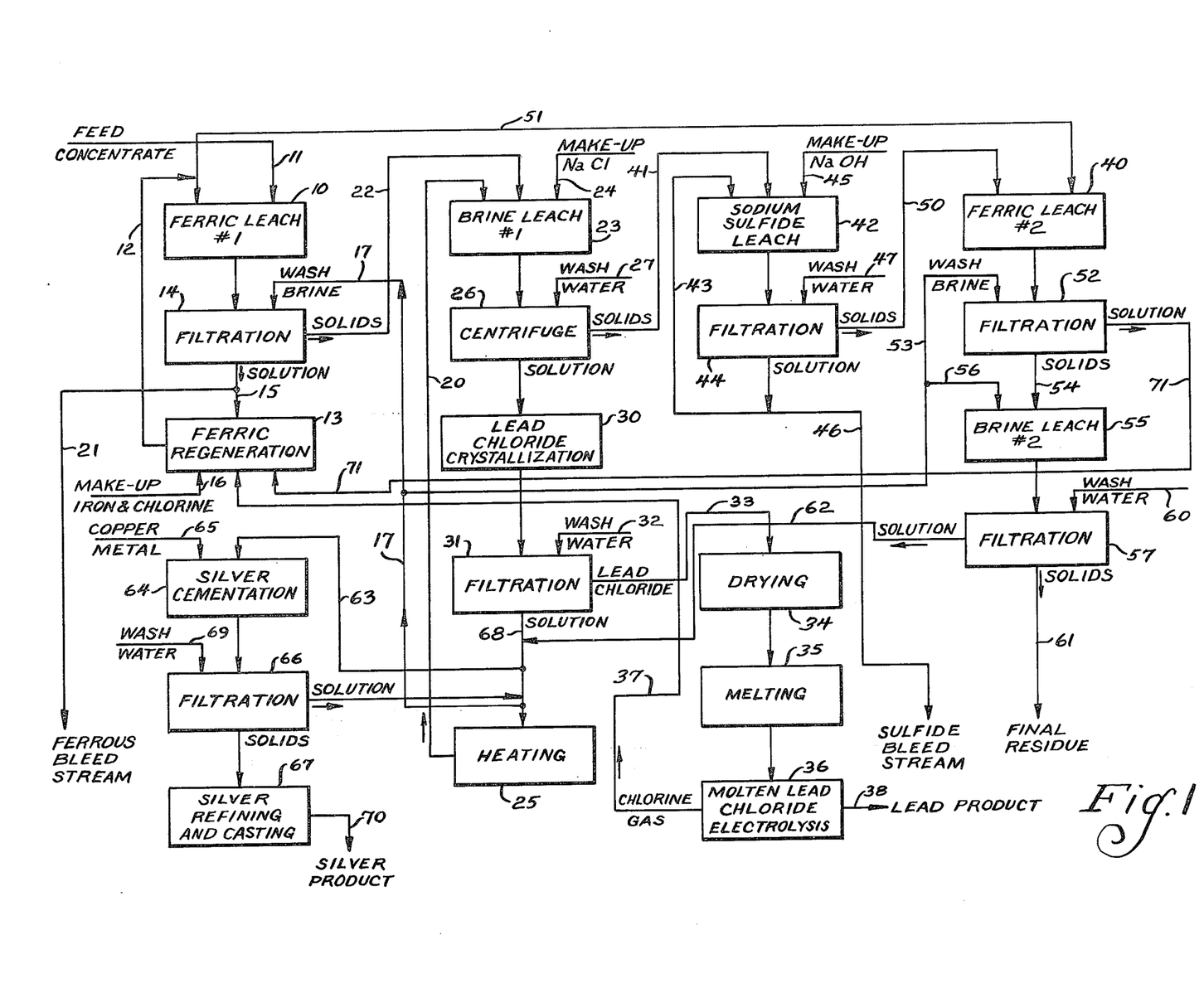
FIGS. 1, 2 and 3 are flow charts of three embodiments, respectively, of the invention with legends and numerals indicating the various stages or steps in the processes and with the same parts in all three embodiments using the same legends and numerals.

In the first embodiment of FIG. 1 the feed concentrate is introduced to a first ferric leach 10 by way of the line 11. This feed stock is a concentrate containing the sulfides of lead and silver. Such a concentrate may be a sulfide flotation concentrate containing a mixture of minerals such as galena (PbS), tetrahedrite [ $(Cu, Fe, Zn, Ag)_{12} (Sb, As)_4 S_{13}$ ] and pyrargyrite ($Ag_3SbS_3$).

This first ferric leach 10 is supplied with an aqueous solution of ferric chloride by a line 12 from a ferric solution regeneration unit 13 to be described in more detail hereinafter. During this first stage the lead sulfide and the silver sulfide are reacted with the ferric chloride to produce the corresponding lead and silver chlorides and water soluble ferrous chlorides with elemental sulfur according to the following equations:

$$PbS + 2FeCl_3 \rightarrow PbCl_2 + 2FeCl_2 + S° \quad (1)$$
$$Ag_2S + 2FeCl_3 \rightarrow 2AgCl + 2FeCl_2 + S° \quad (2)$$

The quantity of ferric chloride solution in this first stage 10 needs to be only that amount which contains a stoichiometric amount of ferric ion to react with all of the metal sulfides that are present and that are attacked under these conditions.

After the ferric ion reaction of the first stage 10 the combined liquid and solids are subjected to filtration as indicated at 14 and the resulting ferrous chloride which is dissolved as a part of the filtrate is directed through line 15 into the ferric solution regeneration unit 13 and the resulting ferric chloride solution is recycled continuously back through the line 12 and into the first stage 10. In order to accomplish the ferric regeneration in the unit 13 this unit is supplied with make-up iron and chlorine gas through lines 16 and 37. The regeneration of the ferric chloride solution from the ferrous chloride obtained from reactions (1) and (2) proceeds according to the following equation:

$$2FeCl_2 + Cl_2 \rightarrow 2FeCl_3$$

Due to the recycling of the ferric ion solution from the regenerator 13 and the line 12 the quantity of lead and silver chlorides produced at this stage exceed the solubility of these salts in the solution and thus the lead and silver chlorides form part of the leach residue together with the elemental sulfur, any unreacted sulfide minerals and any inert minerals such as silica. Other metal chlorides such as those of zinc, copper, iron and the like which have been produced are generally quite soluble in the solution and are separated from the leach residue by the filtration in the filtration unit 14. The leach residue from the filtration 14 forms a filter cake that is washed with a brine solution from a line 17 which is connected to a line 68 to be described hereinafter. This washing with the brine solution from the line 17 serves to separate the last of the zinc, copper, iron and other water soluble metal chlorides from the leach residue solids. A portion of the filtrate from the line 15 which as descibed leads to the ferric solution regeneration unit 13 is discarded as a ferrous bleed stream through a line 21 in order to account volumetrically for the quantity of water introduced as wash solution through line 17 and in the feed concentrate. This serves to prevent an indefinite buildup of water soluble impurities in the solution in the circuit including the line 15.

In the next or second stage the residue of the filtration unit 14 is conveyed through a line 22 to a first brine leach stage 23 where it is leached with an aqueous solution preferably containing between about 250–350 grams per liter of sodium chloride for about ½–2 hours and a temperature of about 50°–100°C. in order to dissolve the lead and silver chlorides that are present in the solids from the filtration 14. This second stage brine leach 23 is supplied with make-up sodium chloride through a line 24. The quantity of brine solution used in the second stage 23 need only be sufficient to dissolve the lead and silver chlorides produced in the first stage 10. Because the presence of zinc and iron is detrimental to the solubility of lead in the brine solution of this second stage 23 the solids of the first stage 10 are washed primarily to prevent the zinc and iron ions from contaminating the brine in the second stage 23 and thereby requiring larger quantities of brine solution for dissolving the lead and silver chlorides. The brine solution supplied by the line 20 to the second stage 23 is heated as indicated above and for this purpose the line 20 leads from a heating unit 25.

The solid residue from the second stage 23 brine leach contains elemental sulfur and unreacted sulfides which must be separated from the hot brine and washed. In the illustrated embodiment this is accomplished by conducting the products from the second stage 23 to a centrifuge 26 where the solids are separated from the solution and washed with wash water supplied through a line 27.

The clear hot solution produced in the centrifuge 26 which is rich with lead and silver produced in the brine leaching of the second stage 23 is cooled in the crystallizing unit 30 to a temperature below the solubility of lead chloride in brine such as about 25°C. This causes the lead chloride to crystallize out and these are removed by filtration in the unit 31, washed with wash water supplied to the line 32, and the filtrate from the filtration unit 31 is heated by passing through the heating unit 25 and conducted through a return line 20 back to the second stage brine leach 23 through the line 20 where make-up sodium chloride is added through the line 24 as previously described.

The separated lead chloride crystals are then conducted through a line 33 from filtration unit 31, are dried in the drying unit 34, melted in the melting unit 35 by heating to a melting temperature and the molten lead chloride, mixed with about 10% molten sodium chloride, is then subjected to an electric current in the customary manner in an electrolysis cell 36 where the electric current converts the molten lead chloride into metallic lead and chlorine gas according to the following equation:

$$PbCl_2 \xrightarrow{electricity} Pb° + Cl_2$$

The chlorine gas generated in the cell 36 is conducted through a line 37 back to the ferric solution regeneration unit 13 to provide a portion of the make-up chlorine for this unit, the rest being supplied through the line 16. The metallic lead is conducted from the cell 36 by way of line 38 and cast into commercial lead ingots for marketing.

The solids residue from the centrifuge separator 26 is substantially free of lead and lead compounds but contains any silver in the feed concentrate 11 in association with any tetrahedrite mineral present. In order to change the structure of the tetrahedrite mineral so that it will be readily attacked by the ferric chloride solution in a second ferric leach stage 40, this residue is conducted from the centrifuge 26 through a line 41 into a sodium sulfide leach stage 42. This leaching is with alkaline sodium sulfide solution and alters the tetrahedrite mineral by extracting its antimony content thereby making the resulting solid material readily reactive with the ferric chloride solution in the second leach stage 40.

The sodium sulfide leach stage 42 is provided with an aqueous solution of an alkaline sodium sulfide solution supplied through line 43 containing about 50–300 grams per liter of sulfide ion and has an alkalinity equivalent in terms of caustic soda to between about 150–400 grams per liter. The leaching is at a temperature of about 90–110°C. for from about 2–20 hours or until the antimony has been extracted. This produces a slurry in the leach stage 42 which is filtered in the filtration unit 44 and the resulting filtrate fed to a recirculation line 43 to the leach stage 42 which is supplied with make-up sodium hydroxide through a line 45. A portion of this filtrate is diverted as a sulfide bleed stream 46 to compensate quantitatively for the amount of wash water supplied by line 47 to wash the solids residue in the filtration unit 44.

The sodium sulfide for the leach stage 42 may be produced by the reaction between the sodium hydroxide supplied through the line 45 and elemental sulfur in the leach residue from the brine leach stage 23 which residue is conducted to the leach stage 42 through the line 41 as previously described. Thus the sulfur and the sodium hydroxide in the sodium sulfide leach stage 42 react to form sodium sulfide. This eliminates the necessity of acquiring sodium sulfide for this leach and is also much less expensive because the only make-up chemical required is the sodium hydroxide as the sulfur is a by-product produced in the process.

The solid residue from the sodium sulfide leach filtration unit 44 is conducted by way of a line 50 to a second ferric leach stage 40 as previously described. This leach stage 40 is supplied with recycled ferric chloride solution through a line 51 which is connected to the ferric chloride recycle line 12 to the first leach stage 10. Thus the ferric solution in this second stage 40 is the same as that in the first leach 10 and the leaching may also be at a temperature of about 25°–100°C. for about 0.5–2 hours.

The resulting slurry in the leach stage 40 is filtered through a filtration unit 52 and the solid residue therefrom is washed with aqueous brine solution conducted to the filtration unit 52 by way of a line 53 leading from the brine solution line 17. This stage converts the remaining silver into silver chloride and the quantity of solution used supplied through line 51 is only that necessary to supply the required amount of ferric chloride to thusly convert this remaining silver into silver chloride.

The solids residue from the filtration unit 52 is conducted through line 54 to a second brine leach stage 55 and is further leached at between about 50°–100°C. for about ½–2 hours with brine drawn from the line 53 through branch line 56. Thus the brine leach here is with the same solution used as wash brine in the filtration units 14 and 52. Here also the amount of solution used in the brine leach stage 55 only needs to be sufficient to dissolve all of the silver chloride produced in the second ferric leach stage 40.

The solid residue from the second leach stage 55 is filtered in the filtration unit 57 to which it is conducted and the resulting filter cake washed with fresh water supplied by the fresh water line 60. The solids from this filtration unit 57 constitute the final residue of the process and is discarded as indicated by the line 61.

The solutions from the first and second brine leach stages 23 and 55 after being separated by the respective filtration units 31 and 57 are combined as indicated by the lines 62 and 68 and a portion of the combined streams conducted through a line 63 to a silver cementing unit 64 where the solution is contacted with copper metal supplied as indicated by the line 65. A portion of the solution from line 68 is directed by line 17 to the filtration unit 14 for the purposes described earlier. The contacting with the copper metal produces cement silver substantially according to the following reaction equation:

$$2Ag^+ + Cu^o \rightarrow 2Ag^o + Cu^{++}$$

This cementation may be accomplished by mixing the solution from the line 63 with the copper supplied through the line 65 in an agitating tank which may comprise the unit 64. The resulting slurry is then passed through a filtration unit 66. From the unit 66 the solids that are primarily the silver metal after being washed with water from line 69 are conducted to a silver refining and casting unit 67 from which the silver product is removed as indicated by the line 70. In the silver cementing unit 64 the copper that is supplied as indicated by the line 65 may be copper powder, plates or rods.

The solution from the filtration unit 52 contains the primarily ferrous ions from the second ferric leach stage 40. This solution is transferred by line 71 to the ferric regeneration unit 13 along with the ferrous solution from the first stage 10 through the line 15. In unit 13 the ferric solution is regenerated by contact of ferrous solution with make-up iron and chlorine supplied through line 16 and chlorine from line 37 as previously described. The regenerated ferric solution may then be recycled as indicated by lines 12 and 51 as all loss of iron in the ferrous bleed stream 21 previously described is compensated for by this addition of iron and chlorine to produce ferric chloride.

In the process of this invention the ferric solution for the first ferric leach 10 may have a ferric concentration of between about 10–225 grams per liter so long as the solution supplied to the leach stage 10 is in the proper proportion with the incoming metal sulfides through the line 11 so that the ferric ion present in the first stage is equal to or slightly greater than the stoichiometric amount needed to react with all the lead and silver sulfide present in the feed. It is preferred however that high strength ferric leach solution be used because the higher the concentration of ferric ions in the leach solution the smaller the quantity of solution required for leaching any given quantity of the concentrate feed 11 and the smaller the vessel sizes that are required in which the leach is accomplished. Likewise, the higher the ferric content of the leach solution the smaller the quantity of solution involved in the subsequent filtration 14 and ferric regeneration stage 13 and, correspondingly, the smaller the sizes of the equipment needed in these portions of the apparatus.

The only solid waste product from the process of this invention is the final residue indicated by the line 61 as previously described. This residue is insoluble and contains elemental sulfur and other residual minerals. The only liquid waste streams from the process are the ferrous bleed stream 21 and the sulfide bleed stream 46. These liquids must be purified before disposal and this can very readily be accomplished as in the following steps procedure.

Any remaining silver may be removed from the ferrous bleed stream 21 by cementation on copper in the same manner as previously described in connection with the cementation unit 64.

Copper and lead may be removed from the ferrous bleed stream 21 by cementation on iron according to the following reaction:

$$Cu^{++} + Fe^o \rightarrow Cu^o + Fe^{++}$$
$$Pb^{++} + Fe^o \rightarrow Pb^o + Fe^{++}$$

For this purpose iron powder or scrap iron may be agitated with the aqueous solution and the resulting slurry clarified by filtration to produce a low grade lead-copper product.

Zinc and iron may be removed from the ferrous bleed stream 21 by precipitation with sulfide ions according to the following reactions:

$$Zn^{++} + S^= \rightarrow ZnS$$
$$Fe^{++} + S^= \rightarrow FeS$$

The resulting slurry would then be filtered to remove the solid. The sulfide bleed stream 46 contains a considerable amount of sodium sulfide and that stream can be readily combined with the ferrous bleed stream for a source of sulfide ions.

Any excess zinc and iron in the ferrous bleed stream 21 may be removed by neutralization with lime after which the solids can easily be collected by filtration for disposal. After this removal of zinc and iron the bleed stream will have been purged of most impurities except for the sodium chloride content.

The following examples illustrate the high lead extraction and the high silver extraction that are possible by the processes of this invention. They also illustrate that metallic lead of commercial grade quality is easily produced from the lead chloride recovered during the process. They also illustrate the recovery of the metallic silver by cementation on copper.

In each of the examples the feed concentrate was lead-silver concentrate produced from ores of the Lucky Friday Mine owned by the assignee of the present application and located near Mullan, Idaho. The following example illustrates the extraction of lead and silver from the concentrate:

EXAMPLE 1

4326 grams of concentrate containing 71.5% lead and 98.02 oz/ton silver was leached in 8.25 liters of a solution containing 4.6 g/l $Pb^{++}$, 0.029 g/l $Ag^+$, 218.5 g/l $Fe^{+3}$ and 459 g/l $Cl^-$ at 50°C. for 2 hours. The resulting slurry was filtered and washed with 4.0 l of a brine containing 17.4 g/l $Pb^{++}$, 0.14 g/l $Ag^+$, 104 g/l Na and 195 g/l $Cl^-$. 10.8 l of filtrate, spent Ferric No. 1, was collected which analyzed 22.8 g/l $Pb^{++}$ and 0.5 g/l $Ag^+$. The filter cake was leached in 71.0 l of the same solution used for the above washing at 100°C. for 0.5 hours. The slurry was filtered and washed with 1.2 l of water. The hot filtrate was cooled to 33°C. to cause crystallization of $PbCl_2$ which was collected by filtration and washed with 0.753 l of water. The resulting crystals weighed 3538 grams and analyzed 73.7% lead, 1.38 oz/ton silver and 25% $Cl^-$, Seventy-three liters of collected filtrate, spent brine No. 1, analyzed 14.8 g/l $Pb^{++}$ and 0.17 g/l Ag.

The residue from the above brine leach was contacted with 2.1 liters of a solution containing 26 g/l sulfide and the equivalent of 389 g/l sodium hydroxide at b 100°C. for 6.0 hours. The slurry was filtered and washed with 0.539 l of water to produce 3.2 l of effluent solution. Neither the feed nor the effluent sulfide solution contained any appreciable dissolved lead or silver.

The above residue was leached in 1.6 l of the same solution as the original concentrate at 50°C. for 2.0 hours and then washed with 0.43 l of the previously mentioned brine solution to collect 2.4 l of liquor containing 14.2 g/l $Pb^{++}$ and 1.30 g/l $Ag^+$. The resulting filter cake was leached in 20.0 l of the brine at 70°C. for 0.5 hours and the slurry was then filtered and washed with 0.3 l of water to produce 19.9 l of spent brine No. 2 containing 18.0 g/l $Pb^{++}$ and 0.29 g/l $Ag^+$. The final solid residue weighed 458.1 grams and analyzed 0.5% lead and 28.92 oz/ton silver. Material balance and extraction calculations are given in the following Table I and the extraction of lead and silver is summarized in Table II.

TABLE II-continued

EXTRACTION OF LEAD AND SILVER FROM CONCENTRATE

| | Percent Extraction | |
|---|---|---|
| | Lead | Silver |
| Extraction by sodium sulfide leach 42, second ferric leach 40 and brine leach No. 2 | 2.33 | 43.3 |
| Total Extractions | 99.9 | 97.1 |

The following examples illustrate the recovery of lead and the recovery of silver.

EXAMPLE 2

Production of commercial grade lead metal via molten salt electrolysis

A 7491 gram charge of lead chloride produced during the test series described above was combined with sodium chloride in a ceramic crucible to form a 10% NaCl - 90% $PbCl_2$ mixture and the resulting material heated to 500°C. to produce a molten salt bath. A pool of molten lead at the bottom of the bath serves as a cathode, and a suspended graphite plate as an anode. A DC current was passed through the cell for 24 hours during which time an additional 5515 grams of the lead chloride was added. The process produced chlorine gas and molten lead. The lead was analyzed and the analysis is compared with standards for corroding grade lead in Table III which shows that the analysis of lead produced by the process meets the standards set for commercial grade lead metal.

TABLE I

MATERIAL BALANCE AND EXTRACTION CALCULATION

| Input | Quantity | | Pb Analysis % or gpl | | Ag Analysis oz/ton or gpl | | Pb Weight | | Ag Weight | |
|---|---|---|---|---|---|---|---|---|---|---|
| Feed Concentrate | 4326 | g | 71.5 | % | 98.02 | oz/t | 3090.0 | g | 14.5 | g |
| Ferric Leach No. 1 Solution | 8.25 | l | 4.6 | g/l | 0.029 | g/l | 37.9 | g | 0.239 | g |
| Ferric Leach No. 1 Wash | 4.0 | l | 17.4 | g/l | 0.14 | g/l | 69.6 | g | 0.560 | g |
| Brine Leach No. 1 Solution | 71.0 | l | 17.4 | g/l | 0.14 | g/l | 1240.0 | g | 9.94 | g |
| Ferric Leach No. 2 Solution | 1.6 | l | 4.6 | g/l | 0.029 | g/l | 7.36 | g | 0.0464 | g |
| Ferric Leach No. 2 Wash | 0.43 | l | 17.4 | g/l | 0.14 | g/l | 7.48 | g | 0.0602 | g |
| Brine Leach No. 2 Solution | 20.0 | l | 17.4 | g/l | 0.14 | g/l | 348.0 | g | 2.80 | g |
| Total | | | | | | | 4800.34 | | 28.15 | |
| Output - Solutions and Lead Chloride | | | | | | | | | | |
| Spent Ferric No. 1 | 10.8 | l | 22.8 | g/l | 0.50 | g/l | 246.0 | g | 5.4 | g |
| Spent Brine No. 1 | 73.0 | l | 14.8 | g/l | 0.17 | g/l | 1080.0 | g | 12.4 | g |
| Lead Chloride | 3538.0 | g | 73.7 | % | 1.38 | oz/t | 2610.0 | g | 0.167 | g |
| Spent Ferric No. 2 | 2.4 | l | 14.2 | g/l | 1.30 | g/l | 34.0 | g | 3.12 | g |
| Spent Brine No. 2 | 19.9 | l | 18.0 | g/l | 0.29 | g/l | 358.0 | g | 5.77 | g |
| Total | | | | | | | 4328.0 | | 26.86 | g |
| Output - Final Residue | | | | | | | | | | |
| Final Residue | 458.1 | g | 0.5 | % | 28.92 | oz/t | 2.29 | g | 0.454 | g |

Extraction

Lead $\left[100 - \dfrac{2.29 \times 100}{3090}\right] = 99.9\%$

Silver $\left[100 - \dfrac{0.454 \times 100}{14.5}\right] = 96.9\%$

TABLE II

EXTRACTION OF LEAD AND SILVER FROM CONCENTRATE

| | Percent Extraction | |
|---|---|---|
| | Lead | Silver |
| Extraction through first ferric leach No. 1, first brine leach No. 1 and lead chloride crystallization | 97.6 | 53.8 |

TABLE III

ANALYSIS OF LEAD METAL PRODUCED VIA MOLTEN $PbCl_2$ ELECTROLYSIS

| Element | Analysis of Produced Lead Metal | Maximum Allowable Level in Corroding Grade Lead |
|---|---|---|
| Silver | 0.0001% | 0.0015% |
| Copper | 0.0002% | 0.0015% |
| Silver & Copper together | 0.0003% | 0.0025% |

TABLE III-continued

ANALYSIS OF LEAD METAL PRODUCED VIA MOLTEN PbCl₂ ELECTROLYSIS

| Element | Analysis of Produced Lead Metal | Maximum Allowable Level in Corroding Grade Lead |
|---|---|---|
| Arsenic, Antimony & Tin together | <0.0016% | 0.002% |
| Zinc | <0.0002% | 0.001% |
| Iron | <0.0001% | 0.002% |
| Bismuth | 0.0006% | 0.050% |
| Lead (by difference) | >99.9 % | 99.94 % |

EXAMPLE 3

Production of silver from brine solutions via cementation on copper

The brine solutions 1 and 2 (Table I) from the first 23 and second 55 brine leaches were allowed to build up to 0.24 grams per liter silver and then directed to cementation unit 64 by way of lines 62, 68 and 63. 20 liters of this solution was agitated in the presence of a copper plate for several hours. A light powder formed on the plate and the solution silver content dropped to 0.16 grams per liter. The powder weighed 1.76 grams and analyzed 92% silver with the major impurities being copper and other heavy metals.

Figure 2:
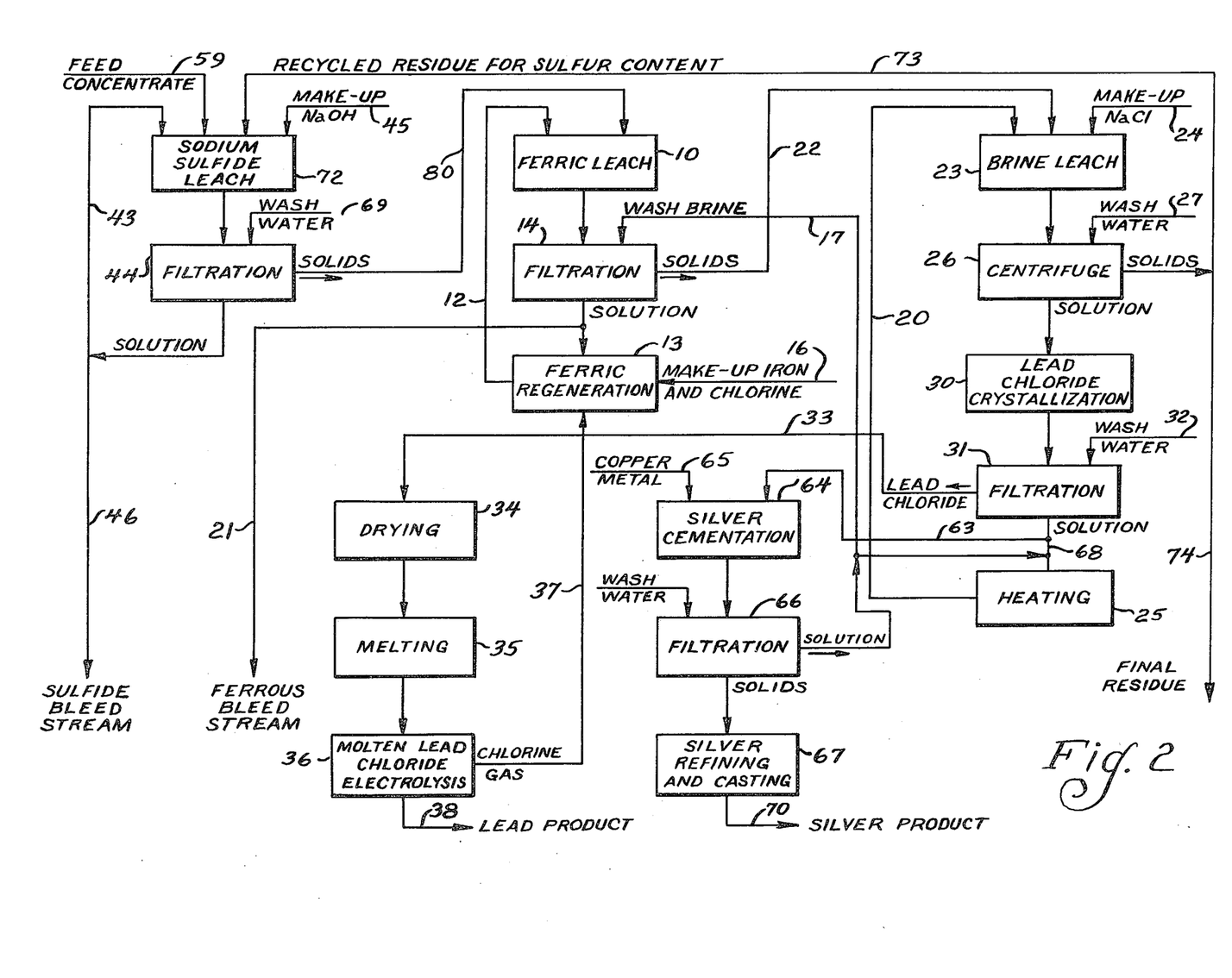

FIG. 2 EMBODIMENT

A second embodiment of the invention is illustrated in FIG. 2. The principal differences of this second embodiment over the first embodiment are as follows.

The feed concentrate through the line 59 is directed to a sodium sulfide leach stage 72 which is similar in operation to the sodium sulfide leach stage 42 of the first embodiment illustrated in FIG. 1. Thus this stage 72 is supplied with recycled solution 43 from a filtration unit 44 and also with make-up sodium hydroxide through the line 45. In addition the leach stage 72 is supplied with recycled residue from a brine leach 23 (to be described hereinafter) for its sulfur content by way of a line 73. In this second embodiment the first stage is the sodium sulfide leach 72 because the feed concentrate through line 59 comprises tetrahedrite mineral. This mineral is not readily attacked by ferric chloride solution as is provided in the FIG. 1 embodiment in the first stage 10. Therefore, the tetrahedrite must be altered to make it subject to attack by ferric chloride and this is accomplished by extracting the antimony content by leaching with the alkaline sodium sulfide solution in the leach stage 72.

The lead-silver concentrates are leached at stage 72 in a solution containing between about 50 and 300 grams per liter sulfide ion with an alkalinity equivalent in terms of caustic soda of between about 150–400 grams per liter, at a temperature of between about 90°–110°C. for between about 2–20 hours. The resulting slurry is filtered and the cake washed with fresh water from line 69. A portion of the filtrate is taken to form a sulfide bleed stream 46 in order to account for the fresh water added to the system and to prevent an indefinite buildup of antimony and other soluble impurities in the solution.

The sulfide ion for this stage may be produced via a reaction between sodium hydroxide from line 45 and elemental sulfur from line 73. As will be seen, subsequent stages in the process convert sulfide sulfur in the feed concentrate into elemental sulfur and this may be used as a source of sulfur for the above reaction. The arrangement eliminates the need to purchase a soluble form of sulfide ion such as Na₂S and allows one to substitute NaOH instead.

After the pretreatment in the sodium sulfide leach 72 the solid from the filtration unit 44 is then conducted by line 80 to the ferric leach 10, then to filtration 14 and then to ferric regeneration 13 in the same manner as in the first embodiment. Likewise the solid from the ferric leach filtration 14 is conducted by line 22 to brine leach 23, then to centrifuge 26, then to lead chloride crystallization 30 and to filtration 31. The lead chloride is treated as in the first embodiment to produce lead 38 and chlorine gas 37. As is indicated in FIG. 2 the residue for sulfur content through the line 73 is supplied from the centrifuge 26 as in the first embodiment with a portion of this solid constituting the final residue that is discarded as indicated by the line 74.

As can be seen by comparing this second embodiment of FIG. 2 with the first embodiment of FIG. 1 this second embodiment uses only one ferric leach 10 and one brine leach 23. Otherwise the structure and operation are essentially the same with the sulfide bleed stream 46 leading from the filtration unit 44 and the recirculation loop 43, the ferrous bleed stream 21 leading from the filtration unit 14 of the ferric leach 10, the lead produced from the molten lead electrolysis unit 36 and the silver product 70 from the silver refining and casting unit 67. Thus the principal difference, as stated earlier, is the preleaching with the sodium sulfide at 72 so that the tetrahedrite concentrate can be reacted in the ferric leach 10.

The following examples illustrate the invention as shown in the second embodiment.

EXAMPLE 4

In this example the feed for the tests was a lead-silver concentrate produced from ores of the Lucky Friday Mine owned by the assignee of the present application and located near Mullan, Idaho. The material contained 69.7% lead, 93.38 oz/ton silver, 6.0% zinc, 0.78% copper, 2.3% iron and 1.2% antimony. The example was carried out in four steps as follows:

1. Sulfide leach: 500 grams of concentrate was leached at 72 in 2.9 liters of solution containing the equivalent of 307 grams per liter sodium hydroxide and 123 grams per liter elemental sulfur at 100°C. for 14 hours. The slurry was filtered and 493.6 grams of residue collected which analyzed 69.3% lead, 92.36 oz/ton silver and 0.1% antimony.

2. Ferric leach: This residue was leached at 10 in 3.0 liters of a ferric chloride solution containing 200 grams per liter iron at 100°C. for 6 hours. The resulting slurry was filtered at 14 to produce 2.7 liters of solution analyzing 7.2 grams per liter lead and 0.2288 grams per liter silver.

3. Brine leach: The cake from the above was leached at 23 in 7.5 liters of a hot 300 grams per liter sodium chloride solution and then filtered at centrifuge 26. The filter cake weighed 65.1 grams and analyzed 0.00% lead and 2.32 oz/ton silver.

4. Lead chloride crystallization at 30: The hot brine from the above step 3 was cooled to 25°C. to produce 167.4 grams of lead chloride analyzing 72.1% lead, 0.1 oz/ton silver and 7.5 liters of solution analyzing 8.7 grams per liter lead and 0.0137 grams per liter silver.

The lead and silver extractions in the above Example 4 were 100 and 99.6%, respectively, thus demonstrating the ability of the process to quantitatively extract these metals from the feed concentrate.

Figure 3:
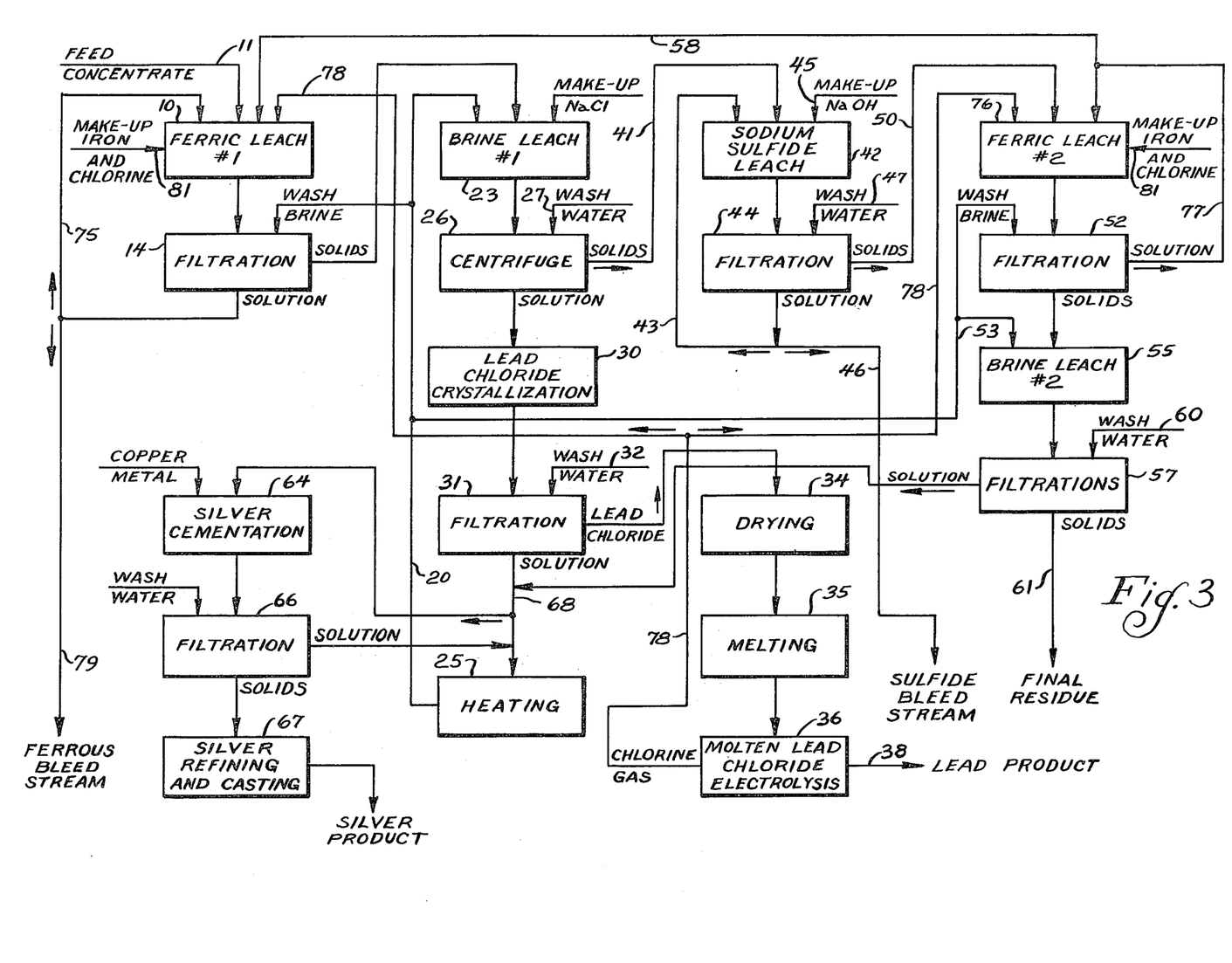

FIG. 3 EMBODIMENT

Fig. 3 illustrates a third embodiment of the invention. This embodiment is similar to that of FIG. 1 except with no ferric regeneration as the solution from filtration unit 14 is directed in a recycle loop 75 back to the first ferric leach stage 10. Also the second ferric leach stage 76 is now supplied with its own recirculation loop 77 from its filtration unit 52. A portion of the solution in recirculation loop 77 is directed by line 58 to the first ferric leach stage 10. Here also the units and lines bearing similar legends function in the same way as the corresponding units and lines of the first two embodiments.

The first two embodiments of FIGS. 1 and 2 use high strength ferric solutions which have certain advantages as already described. However, there are serious disadvantages that are also present such as the following:

1. The loss of ferrous chloride in the ferrous bleed stream is increased with increasing leach solution ferric content. The actual volume of the bleed is generally determined by the quantity of wash water required in certain stages of the process or by using the quantity of bleed stream necessary to control the buildup of harmful impurities in the leach solutions and would be about constant regardless of the leach solution ferric concentration. The higher the leach solution iron content the higher the loss of ferrous chloride in the bleed stream and the more iron chloride must be made up by purchase of iron and chlorine.

2. The regeneration of the ferric chloride leach solution involved contact between a liquid and a gas, an operation which is usually accomplished in a packed column or absorption tower. The solubility of lead chloride and other metal chloride salts in ferric chloride solutions is generally much less than in ferrous chloride solutions and the ferric regeneration process will cause precipitation of these salts as the reaction proceeds. The end result is that one must operate the packed column or absorption tower with a slurry rather than a pure liquid and the operation of the equipment under such conditions is difficult due to the tendency of the slurry solids to settle out and plug the small flow channels usually present in gas-liquid contact equipment.

3. Ferric chloride solutions are generally difficult to handle due to their highly corrosive nature and the more concentrated the ferric ions the more corrosive the solutions become. In commercial practice, the operation of the process in FIG. 1 would require storage and transfer of ferric chloride solutions and the higher the leach solution ferric concentration the higher the ferric content of the solutions involved and the more corrosive would be the solution on pumps, valves, pipes, tanks and similar pieces of process equipment.

In this third embodiment the incoming feed concentrate 11 to the ferric leach stage 10 utilizes only a small quantity of low strength ferric chloride solution because total ferric content is much less than the stoichiometric quantity needed to react with the sulfide present. This slurry in the first unit 10 is agitated and supplied directly with chlorine gas and make-up iron through the line 81. This initial ferric ion supplied through the lines 75 and 81 is quickly consumed by the large quantity of sulfide present but the ferric ion is continuously regenerated in situ. The chlorine gas is supplied in part from the molten lead electrolysis unit 36 as indicated by line 78 in FIG. 3 which supplies chlorine to both the first ferric leach 10 and second ferric leach 76 as the line 78 is branched. Additional chlorine and make-up iron is supplied to each unit 10 and 76 through a line 81. There is thus no need in this third embodiment for the ferric regeneration unit as illustrated at 13 in the FIG. 1 embodiment.

In this third embodiment the advantages discussed above of the use of high strength ferric solution are retained since the solution flow rate to each ferric leach is unchanged. However, the disadvantages of the high strength ferric solution as discussed above are essentially eliminated and the result is that the ferrous bleed stream 79 now contains a low iron content as the regeneration of the ferric solution takes place in the ferric leach units 10 and 76 where salt precipitation is no problem and any ferric solution to be transported or stored contains a maximum, in most instances, of about 20 grams per liter of ferric ion rather than the more corrosive 225 grams per liter of the previous embodiments.

The two following examples illustrate the effectiveness of this third embodiment. In Example 5 the lead-silver concentrate is leached with high strength ferric chloride solution while in Example 6 the leaching of the same type of concentrates is with the low strength ferric solution of this third embodiment using chlorine gas in the leach units 10 and 76 for in situ ferric regeneration. The feed for the tests were also from the Lucky Friday Mine mentioned above.

EXAMPLE 5

High strength ferric leach of lead-silver concentrates

A 1545 gram charge of concentrate analyzing 68.9% lead and 106.7 oz/ton silver was leached in 3.0 liters of ferric chloride solution containing 227.5 grams per leter $Fe^{+3}$ at 50°C. for 0.5 hours and the resulting slurry was then filtered. The filter cake from the ferric chloride leach was leached with enough 300 grams per liter sodium chloride solution to dissolve all the produced lead and silver chlorides. The final residue was collected by filtration, weighed 536.7 grams and analyzed 6.1% lead and 197.68 oz/ton silver.

The lead and silver extractions here were 96.9 and 35.6% respectively. The quantity of ferric ions present in the feed solution was 18.4% in excess of the stoichiometric quantity required for complete reaction with all lead and silver sulfide present in the feed concentrate by reactions 1 and 2.

EXAMPLE 6

In situ ferric regeneration leaching of lead-silver concentrates

A 1573 gram charge of concentrate analyzing 70.0% lead and 91.68 oz/ton silver was leached in 3 liters of a ferric chloride solution containing 20.7 grams per liter $Fe^{+3}$ at 50°C. for 6.75 hours during which time chlorine gas was sparged into the slurry, the slurry filtered and the resulting filter cake leached in enough 300 grams per liter sodium chloride solution to dissolve all the produced lead and silver chlorides. The final residue was collected by filtration, weighed 383.0 grams and analyzed 2.2% lead and 170.38 oz/ton silver.

The lead and silver extractions here were 99.2 and 54.7% respectively. The quantity of ferric ion present in the feed solution was only 10.4% of the stoichiometric quantity required for complete reaction with all lead and silver sulfide present in the feed concentrate by reactions 1 and 2.

As can be seen from the above two examples, in situ ferric regeneration was even more effective for lead and silver extraction than high strength ferric leaching.

We claim:

1. The method of producing lead and silver from materials containing lead and silver sulfides along with the sulfides of zinc and iron, comprising: first leaching said materials with an aqueous water soluble ferric salt solution containing ferric ions to convert said sulfides to the corresponding salts of said lead and silver comprising a solid residue and generate the corresponding ferrous salt solution as a filtrate; separating said ferrous salt solution filtrate from said solid residue; second leaching the solid residue from the first leaching with aqueous sodium chloride brine to dissolve said lead and silver salts and provide a lead and silver salts solution and a further solid residue; cooling said lead and silver salts solution to crystallize and thereby separate said lead salts; removing the lead salt crystals from the resulting silver salt solution; and contacting said silver salt solution with metallic copper thereby to produce cement silver.

2. The method of claim 1 wherein said aqueous ferric salt solution contains about 10–225 grams per liter of ferric ions as ferric chloride.

3. The method of claim 1 wherein said first leaching is at about 25°–100°C. and for about ½–2 hours to convert said insoluble metal sulfides to the insoluble salts corresponding to said ferric salt.

4. The method of claim 1 wherein said first leaching solution comprises ferric chloride.

5. The method of claim 1 wherein said first leach solution contains at least the stoichiometric amount of ferric ions necessary to react with all metal sulfides present thereby producing the metal salts corresponding to the ferric salts together with free sulfur.

6. The method of claim 1 wherein said residue from said first leaching is repeatedly contacted with a recycled aqueous solution of said water soluble ferric salt for converting substantially all said sulfides to the corresponding salt prior to said second leaching with the sodium chloride brine solution.

7. The method of claim 6 wherein a portion of the filtrate from said ferric leaching is ejected as a ferrous ion bleed stream to compensate volumetrically for the amount of brine leaching solution that is introduced, thereby preventing an indefinite buildup of water soluble impurities in the recycled ferric solution.

8. The method of claim 1 wherein the brine solution of said second leaching contains about 250–350 grams per liter of sodium chloride, and said second leaching is for about ½–2 hours at a temperature of about 50°–100°C.

9. The method of claim 1 wherein said further solid residue from said brine leaching which contains elemental sulfur and unreacted metal sulfides is separated from the remaining brine solution and washed with water prior to said cooling to crystallize said lead chloride.

10. The method of claim 1 wherein the resulting solution from said brine leaching is cooled to a temperature of the order of about 25°C. to cause said crystallizing of the lead chloride.

11. The method of claim 10 wherein said lead chloride crystals are separated by filtration, washed with water, dried and melted and thereafter subjected to electrolysis which thereby converts the molten lead chloride into metallic lead and chlorine gas.

12. The method of claim 1 wherein said sulfide material comprises tetrahedrite ore that is normally resistant to said first leaching, and the method further includes pretreating said ore prior to said ferric solution first leaching with an aqueous alkaline sodium sulfide solution to extract the antimony from said ore, thereby altering the ore structure prior to said first leaching.

13. The method of claim 12 wherein said pretreatment of the tetrahedrite ore is with a solution containing about 50–300 grams per liter of sulfide ions from said sodium sulfide and having an alkalinity equivalent in terms of sodium hydroxide of between about 150–400 grams per liter and the pretreating comprises leaching at a temperature of about 90°–110°C. for about 2–20 hours until substantially all antimony has been extracted from said tetrahedrite.

14. The method of claim 13 further including filtering the resulting slurry, washing the resulting filter cake with fresh water, discarding a portion of the filtrate in the form of a sulfide bleed stream to compensate volumetrically for the amount of wash water added and to prevent an indefinite buildup of insoluble impurities in the solution.

15. The method of claim 13 wherein the insoluble residue from said pretreating leaching is further leached with an aqueous solution of brine for a time and at a temperature sufficient substantially to dissolve all remaining silver salt produced in said first leaching.

16. The method of claim 1 wherein said lead salt is heated to a molten condition and subjected to electrolysis to generate metallic lead.

17. The method of claim 1 wherein the solids from said brine leaching is further leached with sodium sulfide solution and the solids from this further leaching is subjected to a second leaching with an aqueous water soluble ferric salt solution containing ferric ions to convert the remaining sulfides to the corresponding salts of lead and silver.

18. The method of claim 1 wherein said ferrous salt solution filtrate from said first leaching is regenerated to the ferric state for recycling through said first leaching by contacting said filtrate with chlorine gas substantially according to the following reaction:

$$2FeCl_2 + 2Cl_2 \rightarrow 2FeCl_3$$

19. The method of claim 1 wherein said ferric salt solution of said first leaching contains a stoichiometrically inadequate amount of ferric salt and said ferric salt solution is contacted with chlorine gas in said first leaching to regenerate ferric ion in situ as the existing ferric ion is converted to the ferrous state by said converting of the sulfides to the corresponding salts.

20. The method of claim 19 wherein said stoichiometrically inadequate first leaching solution contains from about 10 to 20 grams per liter of ferric ions as ferric chloride.

21. The method of claim 20 wherein said ferric ions are continuously regenerated by continuously adding chlorine while cycling said first leaching solution repeatedly through said materials.

22. The method of claim 1 wherein the resulting solution from said brine leaching is cooled to a temperature of the order of about 25°C. to cause said crystalizing of the lead chloride, said separated crystals are washed with water, dried and melted and thereafter subjected to electrolysis which thereby converts the molten lead chloride into metallic lead and chlorine gas, said ferric salt solution of said first leaching contains a stoichiometrically inadequate amount of ferric salt and said ferric salt solution is contacted with chlorine gas in said first leaching to regenerate ferric ion in situ as the existing ferric ion is converted to the ferrous state by said converting of the sulfides to the corresponding salts, said chlorine for the regenerating being provided by said electrolysis of the lead chloride.

* * * * *